(12) United States Patent
Guen et al.

(10) Patent No.: US 9,887,411 B2
(45) Date of Patent: Feb. 6, 2018

(54) RECHARGEABLE BATTERY

(71) Applicant: SAMSUNG SDI CO., LTD., Yongin-si, Gyeonggi-do (KR)

(72) Inventors: Min-Hyung Guen, Yongin-si (KR); Yong-Chul Seo, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 263 days.

(21) Appl. No.: 14/703,175

(22) Filed: May 4, 2015

(65) Prior Publication Data

US 2016/0043378 A1   Feb. 11, 2016

(30) Foreign Application Priority Data

Aug. 8, 2014   (KR) .......................... 10-2014-0102611

(51) Int. Cl.
   *H01M 2/34*   (2006.01)
   *H01M 2/30*   (2006.01)
(52) U.S. Cl.
   CPC ............... *H01M 2/34* (2013.01); *H01M 2/30* (2013.01); *H01M 2200/00* (2013.01)

(58) Field of Classification Search
   None
   See application file for complete search history.

(56) References Cited

U.S. PATENT DOCUMENTS

2004/0170887 A1* 9/2004 Masumoto .......... H01M 2/0404
                                                       429/61
2012/0225348 A1* 9/2012 Kim .................. H01M 2/024
                                                       429/179

FOREIGN PATENT DOCUMENTS

KR   10-2011-0047609 A   5/2011
KR   10-2012-0060724 A   6/2012
KR   10-2013-0106649 A   9/2013

* cited by examiner

*Primary Examiner* — Barbara L Gilliam
*Assistant Examiner* — Adam A Arciero
(74) *Attorney, Agent, or Firm* — Lee & Morse, P.C.

(57) ABSTRACT

A rechargeable battery includes a case having an electrode assembly, a cap plate to seal an opening of the case, and an electrode terminal in the cap plate. The electrode terminal includes a plate terminal at an upper area and a bent plate to electrically couple the plate terminal to the cap plate. The bent plate sets a gap between the plate terminal and the cap plate, and provides a current path from the plate terminal to the cap plate having a length greater than an interval between the plate terminal and the cap plate.

18 Claims, 9 Drawing Sheets

RECHARGEABLE BATTERY

CROSS-REFERENCE TO RELATED APPLICATION

Korean Patent Application No. 10-2014-0102611, filed on Aug. 8, 2014, and entitled, "Rechargeable Battery," is incorporated by reference herein in its entirety.

BACKGROUND

1. Field

One or more embodiments described herein relate to a rechargeable battery.

2. Description of the Related Art

Rechargeable batteries are used in a variety of applications. A low-capacity rechargeable battery is used in small portable electronic devices such as mobile phones, notebook computers, and camcorders. A high-capacity rechargeable battery is used for driving the motor of a hybrid vehicle.

A rechargeable battery generally includes an electrode assembly having a positive electrode and a negative electrode at opposite surfaces of a separator. The electrode assembly is include din a case, and a cap plate is used to seal an opening of the case. Positive and negative electrode terminals penetrate the cap plate for electrical coupling to the electrode assembly. In one instance, the positive electrode terminal may be electrically coupled to the cap plate to positively charge the cap plate and the case.

When a conductor (e.g., a nail) penetrates the case and pierces the electrode assembly, high voltage current flowing through the positive electrode terminal may flow back to the electrode assembly by way of the cap plate, the case, and the conductor.

In order to protect against damage from penetration of the conductor, a short-circuit member may positioned be between the electrode assembly and the case, and may be negatively charged. When the conductor penetrates the positively charged case, the conductor contacts the negatively charged short-circuit member and current charged in the electrode assembly discharges through the conductor from the case and the short-circuit member, to thereby prevent ignition or explosion of the electrode assembly.

When the conductor penetrates the case and pierces the short-circuit member, the conductor forms a path through which the current flows out of the electrode assembly, to thereby allow a limited amount of current to be controlled. In addition, the current flowing out of the electrode assembly may be introduced into the conductor via the positive electrode terminal, the cap plate, and the case, and may cause secondary damage to the electrode assembly. In this case, the positive electrode terminal makes surface contact with the cap plate, and thereby is unable to control the amount of current.

SUMMARY

In accordance with one embodiment, a rechargeable battery includes an electrode assembly to be charged and discharged; a case including the electrode assembly; a cap plate to seal an opening of the case; and an electrode terminal in the cap plate and electrically coupled to the electrode assembly, wherein the electrode terminal includes a plate terminal at an upper area and a bent plate to electrically couple the plate terminal to the cap plate, wherein the bent plate sets a gap between the plate terminal and the cap plate.

The electrode terminal may include a rivet terminal in a terminal hole of the cap plate, and a gasket in the terminal hole of the cap plate adjacent the rivet terminal and in a through-hole of the bending plate, the gasket to provide electrically insulation between the cap plate and the bending plate. The electrode terminal may include an insertion plate in the gap, the insertion plate may be electrically insulated from the bending plate.

The bending plate may include a first insulating layer at an inner side of the gap. The bending plate may include a second insulating layer a side facing the plate terminal. The first insulating layer may be on an entire inner surface of the bending plate. The second insulating layer maybe partially formed in the bending portion of the bending plate based on the through-hole. The bending plate may include a fuse at opposite sides of an area where the bending portion is partially torn off.

The electrode terminal may include a negative electrode terminal coupled to a negative electrode of the electrode assembly, and a positive electrode terminal coupled to a positive electrode of the electrode assembly, and the negative electrode terminal may be electrically coupled to a short-circuit surface between the electrode assembly and the case.

The plate terminal may have a first side that is conductive and a second side that provides insulation above the bending plate. The bending plate may include a first portion corresponding to the plate terminal and a second portion extending from the plate terminal. The second portion may include a fuse at opposite sides of a portion where the bending portion is partially torn off. The bending plate sets the gap in a direction that crosses a plane of the cap plate.

In accordance with another embodiment, a battery includes a cap plate; a first terminal; a second terminal; a plate terminal adjacent the first terminal; and a plate to electrically couple the plate terminal to the cap plate, wherein the plate has a curve and provides a current path from the plate terminal to the cap plate having a length greater than an interval between the plate terminal and the cap plate.

The first terminal may have a rivet terminal in a hole of the cap plate, and a gasket in the hole of the cap plate adjacent the rivet terminal and in a through-hole of the bending plate, the gasket may provide electrically insulation between the cap plate and the plate having the curve. The first terminal may include an insertion plate in a gap between first and second surfaces of the plate having the curve, the insertion plate electrically insulated from the plate having the curve.

The plate may have the curve includes a first insulating layer at an inner side of the gap. The plate having the curve may includes a second insulating layer a side facing the plate terminal. The second insulating layer may be partially at the curve of the plate. The first terminal may be a positive terminal and the second terminal may be a negative terminal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
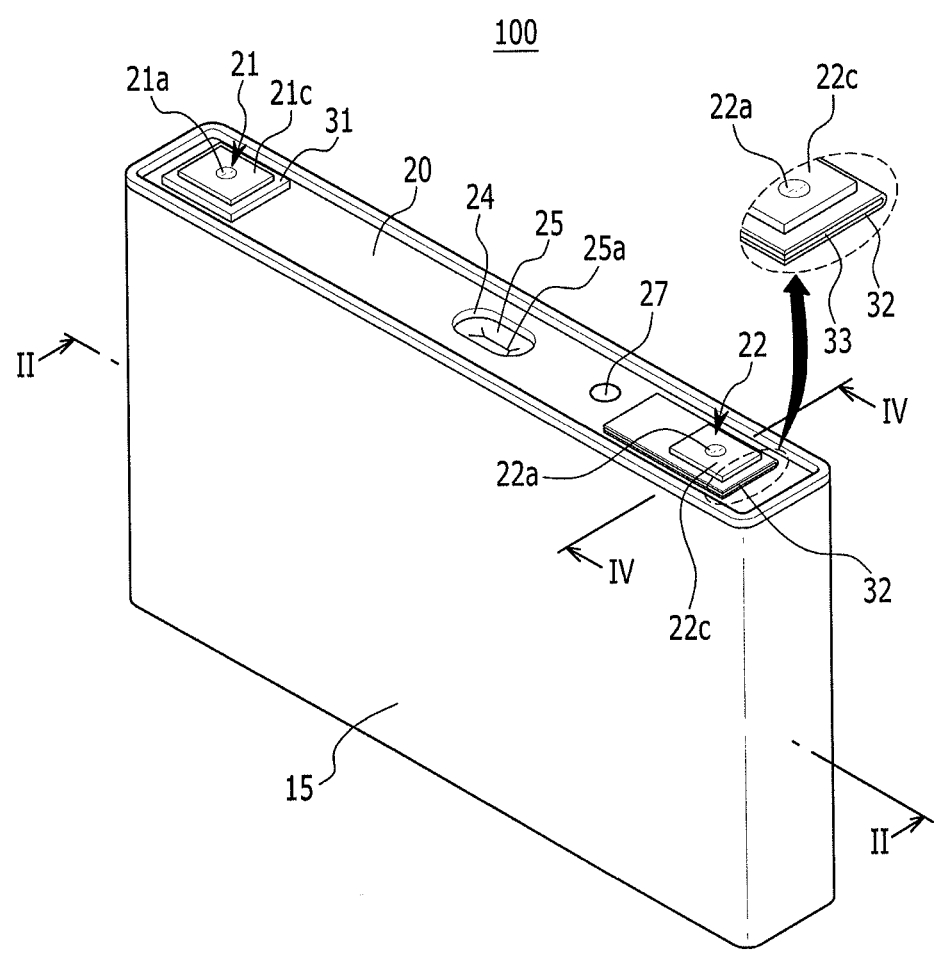
FIG. 1 illustrates an embodiment of a rechargeable battery.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, Like reference numerals refer to like elements throughout.

Figure 2:
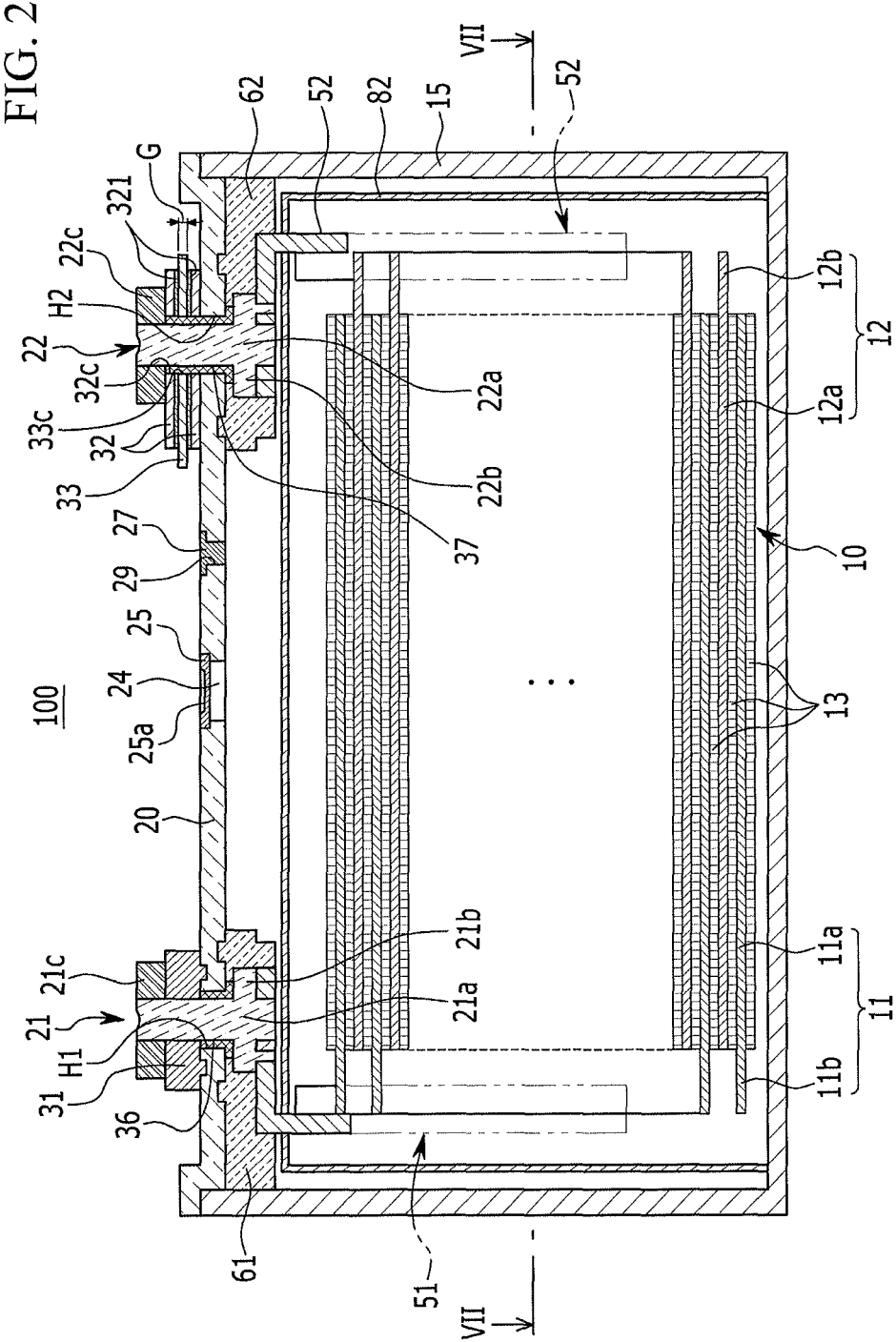
FIG. 2 illustrates a view along section line II-II in FIG. 1.

FIG. 1 illustrates an embodiment of a rechargeable battery 100, and FIG. 2 is a cross-sectional view of FIG. 1 taken along line II-II in FIG. 1. Referring to FIGS. 1 and 2, the rechargeable battery 100 includes an electrode assembly 10 to be charged and discharged, a case 15 for accommodating the electrode assembly 10, a cap plate 20 for sealing an opening of the case 15, and electrode terminals (e.g., negative and positive electrode terminals 21 and 22) penetrating the cap plate 20.

The electrode assembly 10 includes negative and positive electrodes 11 and 12 at opposing surfaces of a separator 13, which acts as an insulator. The negative electrode 11, the separator 13, and the positive electrode 12 may be spirally wound in a jelly-roll state. The positive and negative electrodes 11 and 12 respectively include coated regions 11a and 12a and uncoated regions 11b and 12b. In the coated regions 11a and 12a, an active material is coated on current collectors made of a metal plate. In the uncoated regions 11b and 12b, an active material is not coated thereon and are formed as exposed current collectors. The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12.

Further, the uncoated regions 11b and 12b of the negative and positive electrodes 11 and 12 are respective opposing ends of the electrode assembly 10. For example, the case 15 may be substantially formed as a cuboid in which a space for accommodating the electrode assembly 10 and an electrolyte solution is set. The case 15 may have an opening that connects inner and outer spaces. The opening allows the electrode assembly 10 to be inserted into the case 15.

The cap plate 20 is installed in/over the opening of the case 15 to seal the case 15. The case 15 and the cap plate 20 are formed, for example, of aluminum and may be welded together. The cap plate 20 includes an electrolyte injection opening 29, a vent hole 24, and terminals H1 and H2. After combining the cap plate 20 and the case 15, the electrolyte injection opening 29 allows the electrolyte solution to be injected into the case 15. After being injected with the electrolyte solution, the electrolyte injection opening 29 is sealed by a sealing cap 27.

The vent hole 24 is sealed by a vent plate 25 to discharge internal pressure of the rechargeable battery 100. The vent plate 25 is ruptured to open the vent hole 24 when the internal pressure of the rechargeable battery 100 reaches a predetermined pressure. The vent plate 25 is provided with a notch 25a that induces the rupture.

The negative and positive electrode terminals 21 and 22 are installed in the terminal holes H1 and H2 of the cap plate 20 and are electrically coupled to the electrode assembly 10. Specifically, the negative electrode terminal 21 is electrically coupled to the negative electrode 11 of the electrode assembly 10, and the positive electrode terminal 22 is electrically coupled to the positive electrode 12 of the electrode assembly 10. The electrode assembly 10 may be drawn out of the case 15 through the negative and positive electrode terminals 21 and 22.

The negative and positive electrode terminals 21 and 22 respectively include: rivet terminals 21a and 22a in the terminal holes H1 and H2 of the cap plate 20; flanges 21b and 22b integrally and widely formed with the rivet terminals 21a and 22a inside the cap plate 20; and plate terminals 21c and 22c outside the cap plate 20 for coupling to the rivet terminals 21a and 22a by riveting or welding.

An insulating member 31 of the negative electrode terminal 21 is between the plate terminal 21c and the cap plate 20, to electrically insulate the plate terminal 21c from the cap plate 20. The cap plate 20 maintains an electrically insulated state from the negative electrode terminal 21. For example, the insulating member 31 is interposed between the plate terminal 21c and the cap plate 20 and is penetrated by the rivet terminal 21a. By combining the insulating member 31 and the plate terminal 21c with an upper part of the rivet terminal 21a and caulking the upper part thereof, the insulating member 31 and the plate terminal 21c are combined with the upper part of the rivet terminal 21a.

A negative electrode gasket 36 is installed between the rivet terminal 21a of the negative electrode terminal 21 and an inner side of the terminal hole H1 of the cap plate 20. The negative electrode gasket 36 provides a seal and electrical insulation between the rivet terminal 21a of the negative electrode terminal 21 and the cap plate 20. The negative electrode gasket 36 is elongated between the rivet terminal 21a and the upper insulating member 31. For example, the negative electrode gasket 36 may help to reinforce the sealing and electrical insulation between the rivet terminal 21a and the insulating member 31.

Figure 3:
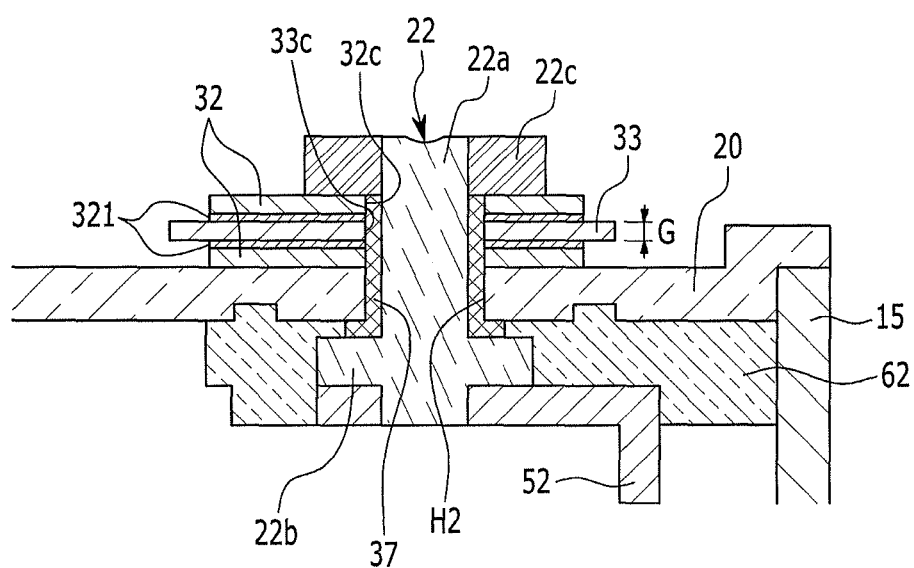
FIG. 3 illustrates an enlarged view of a positive electrode terminal in FIG. 2.
Figure 4:
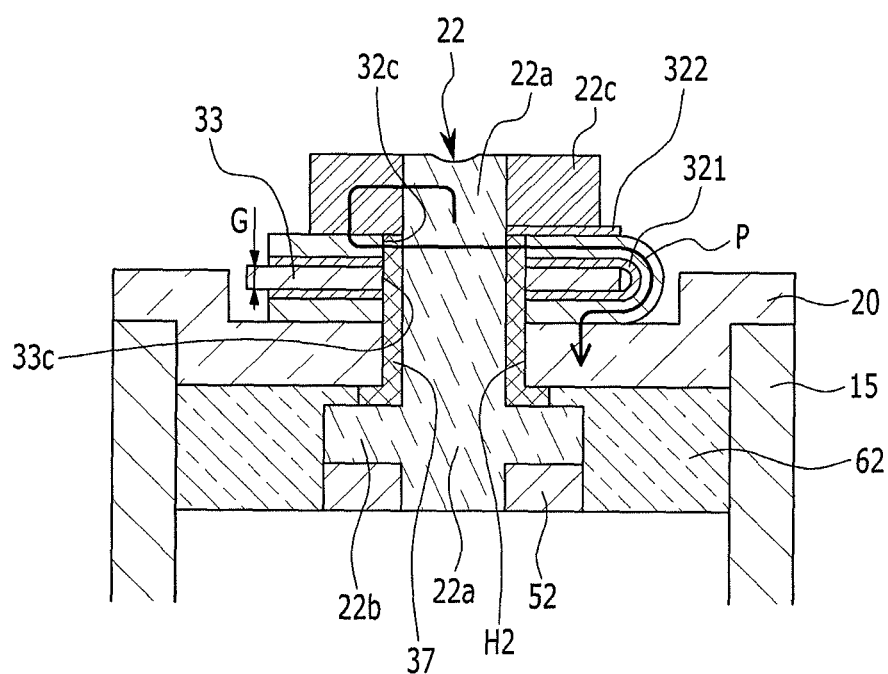
FIG. 4 illustrates a view along section line IV-IV in FIG. 1.

FIG. 3 illustrates an embodiment of the positive electrode terminal in FIG. 2, and FIG. 4 is a cross-sectional view taken along the line IV-IV in FIG. 1. Referring to FIGS. 1 to 4, a bending plate 32 of the positive electrode terminal 22 is installed between the plate terminal 22c and the cap plate 20. The bending plate 32 electrically couples the cap plate 20 and the plate terminal 22c, e.g., the cap plate 20 maintains an electrically coupled state with the positive electrode terminal 22.

In one embodiment, the bending plate 32 is curved and includes a gap G between the plate terminal 22c and the cap plate 20. The bending plate 32 electrically couples the plate terminal 22c to the cap plate 20. The bending plate 32 sets the gap G in a direction that crosses a plane of the cap plate 20. For example, the gap G is set in a length direction of the rivet terminal 22a that crosses the plane of the cap plate 20.

The positive electrode terminal 22 includes an insertion plate 33 inserted into the gap G and is electrically insulated from the bending plate 32. For example, the bending plate 32 and the insertion plate 33 are between the plate terminal 22c and the cap plate 20, and are penetrated by the rivet terminal 22a through respective through-holes 32c and 33c. By combining the bending plate 32, the insertion plate 33, and the plate terminal 22c to the upper part of the rivet terminal 22a and caulking the upper part thereof, the bending plate 32, the insertion plate 33, and the plate terminal 22c are coupled to the upper part of the rivet terminal 22a.

The bending plate 32 may include a portion 32a that corresponds to the plate terminal 22c, and an extended portion 32b that extends from the portion 32a. For example, in the top plan view (refer to FIG. 5) of the bending plate 32, the portion 32a and the extended portion 32b may respectively be divided into portions contacting and not contacting the plate terminal 22c.

The negative electrode gasket 36 is installed between the rivet terminal 21a of the negative electrode terminal 21 and the inner side of the terminal hole H1 of the cap plate 20, in order to seal and provide electrically insulation between the rivet terminal 21a of the negative electrode terminal 21 and the cap plate 20. The negative electrode gasket 36 is installed to be elongated between the rivet terminal 21a and the insulating member 31. For example, the negative electrode gasket 36 may further reinforce the sealing and electrical insulation between the rivet terminal 21a and the insulating member 31.

A positive electrode gasket 37 is installed between the rivet terminal 22a of the positive electrode terminal 22 and an inner side of the terminal hole H2 of the cap plate 20, in order to seal and provide electrically insulation between the rivet terminal 22a of the positive electrode terminal 22 and the cap plate 20.

Further, the positive electrode gasket 37 is elongated between the rivet terminal 22a and the bending plate 32, and between the rivet terminal 22a and the insertion plate 33. For example, the positive electrode gasket 37 is between the rivet terminal 22a of the positive electrode terminal 22 and inner sides of through-holes 32c and 33c of the bending and insertion plates 32 and 33, in order to seal and provide electrically insulation between the rivet terminal 22a of the positive electrode terminal 22 and the bending and insertion plates 32 and 33.

The negative and positive electrode gaskets 36 and 37 are elongated between the flanges 21b and 22b and an inner side of the cap plate 20, to thereby provide further sealing and electrical insulation between the flanges 21b and 22b and the cap plate 20. For example, the negative and positive electrode gaskets 36 and 37 prevent the electrolyte solution from leaking through the terminal holes H1 and H2 by installing the negative and positive electrode terminals 21 and 22 at the cap plate 20.

Figure 5:
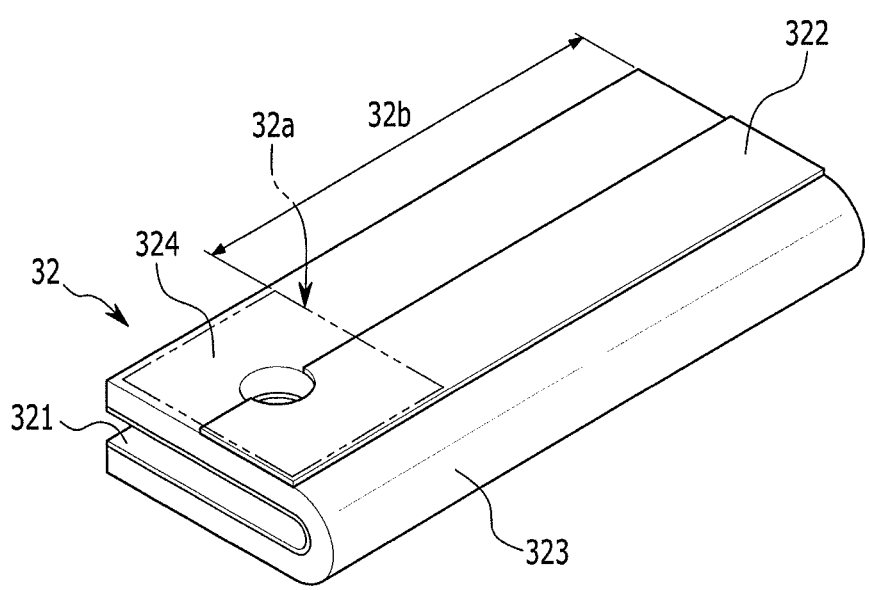
FIG. 5 illustrates an embodiment of a bending plate for a positive terminal.

FIG. 5 illustrates an embodiment of a bending plate applicable to a terminal, e.g., the positive electrode terminal in the aforementioned embodiment. Referring to FIGS. 3 to 5, the bending plate 32 includes a first insulating layer 321 at an inner side that forms the gap G, and a second insulating layer 322 at a side that faces the plate terminal 22c.

When the insertion plate 33 is formed of a conductor, the first insulating layer 321 is formed on an entire inner surface of the bending plate 32 to electrically insulate the bending plate 32 from the insertion plate 33. The second insulating layer 322 may be partially formed at a bending portion 323 in the bending plate 32 based on the through-hole 32c. Thus, when the bending plate 32 is installed in the positive electrode terminal 22, the rivet terminal 22a is electrically coupled to the plate terminal 22c, and the plate terminal 22c is electrically coupled to a portion 324 of the bending plate 32 where the second insulating layer 322 is not formed. Thus, above the bending plate 32, the plate terminal 22c provides a conductive structure at a first side and provides an insulating structure at a second side.

Also, a current path P is formed from the positive electrode terminal 22 to the rivet terminal 22a and the plate terminal 22c, and then to the bending plate 32, the bending portion 323, a lower part of the bending plate 32, and the cap plate 20.

The bending plate 32, therefore, increases the length of the current path P from the plate terminal 22c to the cap plate 20. For example, because the bending plate 32 is bent to have the gap G, the length of the current path P is formed longer than an interval between the plate terminal 22c and the cap plate 20 that is simply set in a length direction of the rivet terminal 22a.

Referring again to FIG. 2, negative and positive electrode lead tabs 51 and 52 respectively electrically couple the negative and positive electrode terminals 21 and 22 with the negative and positive electrodes 11 and 12 of the electrode assembly 10. For example, by combining the negative and positive electrode lead tabs 51 and 52 to lower ends of the rivet terminals 21a and 22a and caulking the lower ends thereof, the negative and positive electrode lead tabs 51 and 52 are supported by the flanges 21b and 22b and are coupled to the lower ends of the rivet terminals 21a and 22a.

Negative and positive insulating members 61 and 62 are respectively installed between the negative and positive electrode lead tabs 51 and 52 and the cap plate 20, in order to electrically insulate the negative and positive electrode lead tabs 51 and 52 from the cap plate 20. Further, the negative and positive insulating members 61 and 62 are respectively combined to the cap plate 20 at one side while enclosing the negative and positive electrode lead tabs 51 and 52, the rivet terminals 21a and 22a, and the flanges 21b and 22b at the other side. This may stabilize the connection structure therebetween.

Figure 6:
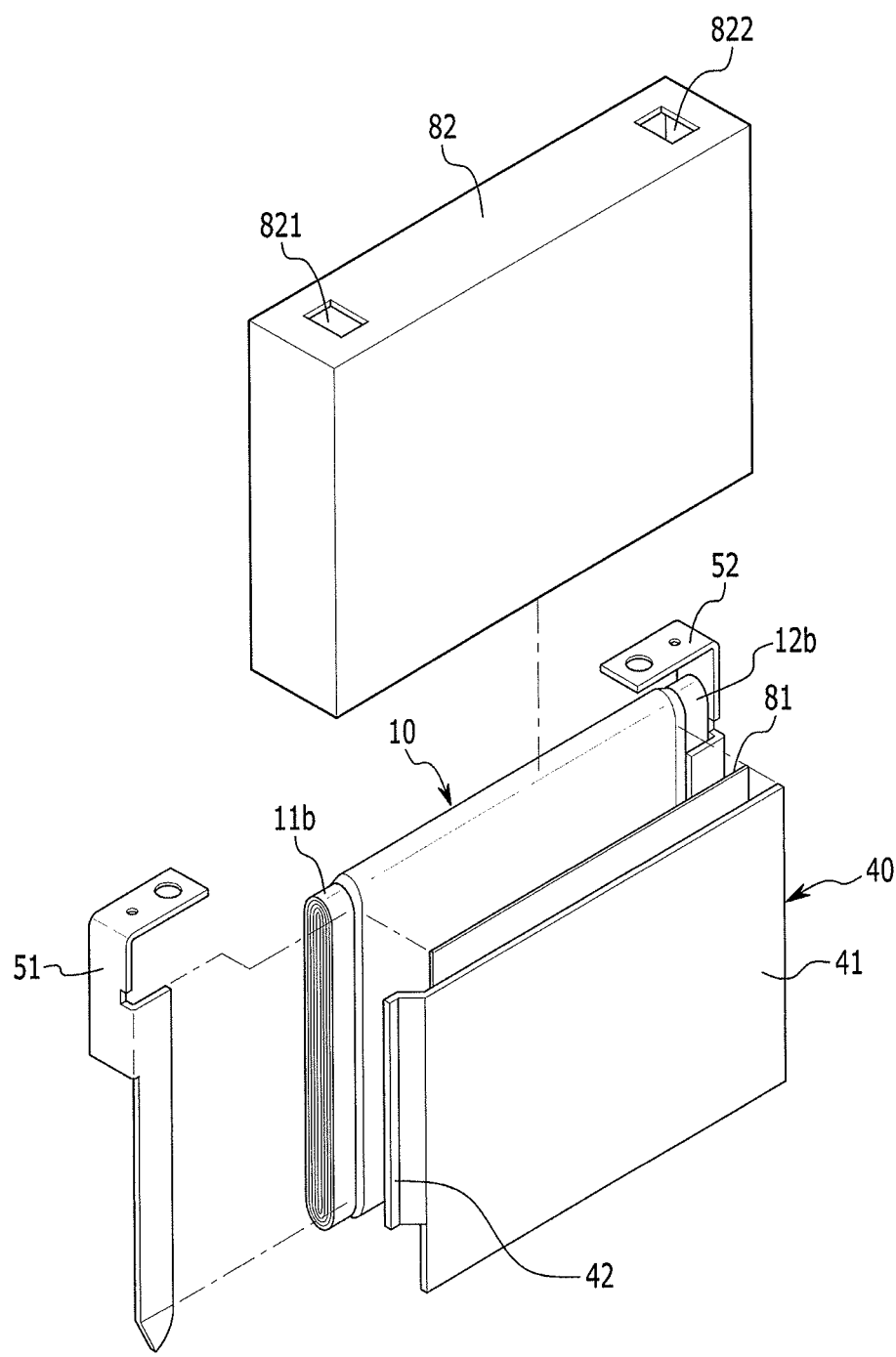
FIG. 6 illustrates an electrode assembly and short-circuit member.
Figure 7:
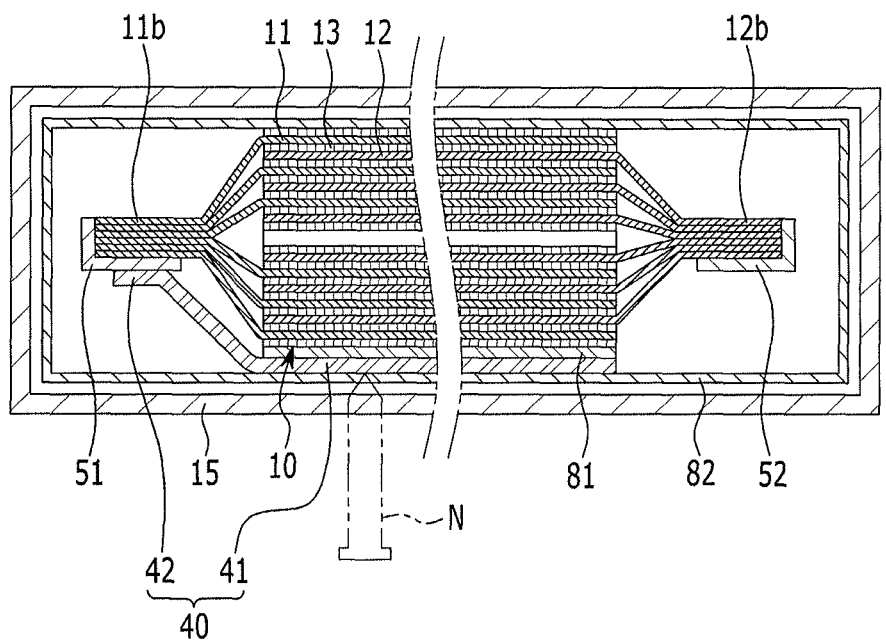
FIG. 7 illustrates a view along section line VII-VII in FIG. 2.

FIG. 6 illustrates an embodiment of an electrode assembly and a short-circuit member, and FIG. 7 is a cross-sectional view along line VII-VII in FIG. 2. Referring to FIGS. 6 and 7, the rechargeable battery 100 may include a short-circuit surface or member 40 between the electrode assembly 10 and the case 15. The short-circuit member 40 is between the electrode assembly 10 and the inner side of the case 15. The short-circuit member 40 is electrically coupled to the negative electrode 11 of the electrode assembly 10 to be negatively charged. On the other hand, because the cap plate 20 is coupled to the positive electrode terminal 22 through the bending plate 32, the cap plate 20 and the case 15 are positively charged.

The short-circuit member 40 is formed of a conductive metal and is between the electrode assembly 10 and the case 15 to have an insulating structure. For the insulating structure of the short-circuit member 40, a first insulating member 81 and a second insulating member 82 are disposed at opposite surfaces of the short-circuit member 40.

In this case, the negative and positive electrode lead tabs 51 and 52 coupled to the electrode assembly 10 are respectively coupled to the negative and positive electrode terminals 21 and 22 through through-holes 821 and 822 that are formed in the second insulating member 82.

The short-circuit member 40 is between one side of the electrode assembly 10 and the inner side of the case 15, in order to deal with penetration of the conductor N at one side of the rechargeable battery 100. In one embodiment, a plurality of short-circuit members may respectively be disposed between opposite sides of the electrode assembly and the inner side of the case, in order to deal with penetration of the conductor at opposite sides of the rechargeable battery.

For example, the short-circuit member 40 may include a plate portion 41 to interpose the first insulating member 81 between a flat shape of the electrode assembly 10 and its flat lateral side, and a protruding portion 42 that protrudes from the plate portion 41 to be coupled to the negative electrode lead tab 51.

Before the electrode assembly 10 is short-circuited by the penetration of the conductor N inside the electrode assembly 10, the negatively charged plate portion 41 may be short-circuited with the positively charged case 15 through the conductor N outside of the electrode assembly 10. For example, when the conductor N penetrates, the conductor N may penetrate the case 15 and then the electrode assembly 10.

In this case, before being short-circuited inside the electrode assembly 10, the short-circuit member 40 between the case 15 and the electrode assembly 10 is short-circuited with the case 15 through the conductor N outside of the electrode assembly 10.

In this case, a voltage charged in the electrode assembly 10 is rapidly discharged outside the electrode assembly 10 through the case 15, the conductor N, and the short-circuit member 40.

In addition, the external current of the electrode assembly 10 flows to the cap plate 20 through the rivet terminal 22a of the positive electrode terminal 22 coupled to the positive electrode lead tab 52 and the current path P coupled to the plate terminal 22c and the bending plate 32. In this case, because the bending plate 32 allows a length of the current path P to be longer, it may delay current flow, and may further delay current flow by increasing its area on the current path P. By controlling the external current of the electrode assembly 10 using the bending plate 32, secondary damage of the electrode assembly 10 due to the short-circuit current may be prevented when the conductor N penetrates the case 15.

Figure 8:
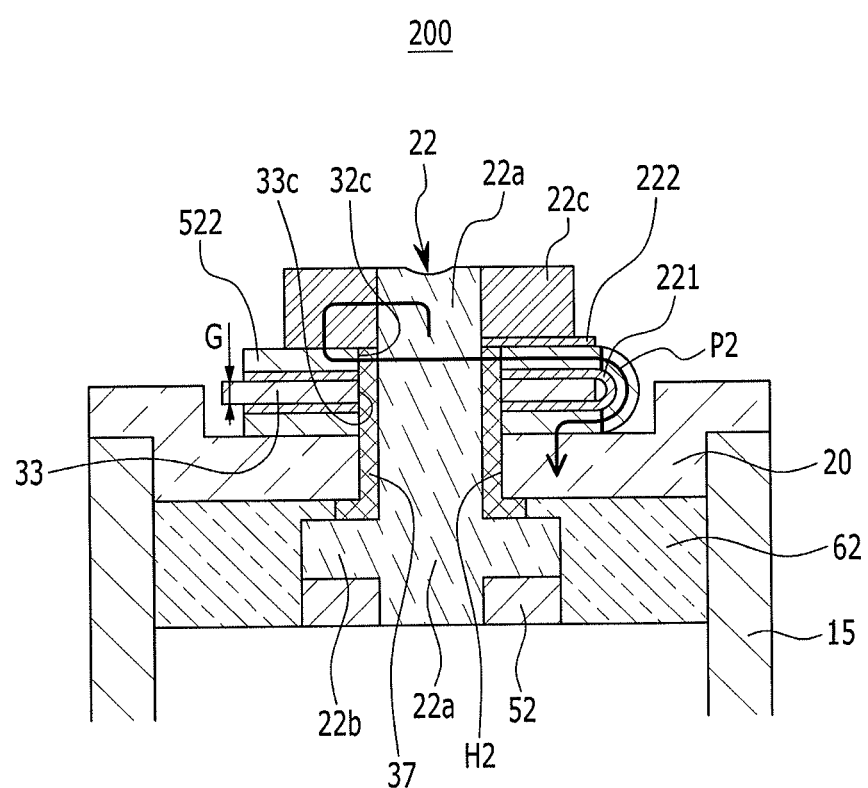
FIG. 8 illustrates another embodiment of a rechargeable battery.
Figure 9:
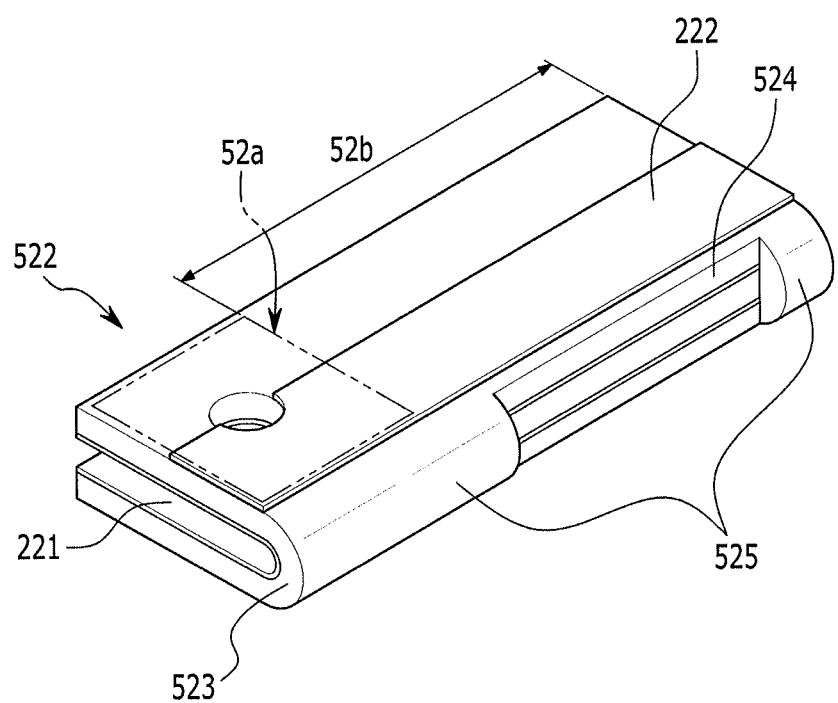
FIG. 9 illustrates an embodiment of a bending plate in FIG. 8.

FIG. 8 illustrates another embodiment of a rechargeable battery 200, and FIG. 9 illustrates an embodiment of a bending plate in FIG. 8. Referring to FIGS. 8 and 9, in the positive electrode terminal 22, a bending plate 522 is further provided with a fuse 525 at opposite sides of a tear-off portion 524 where a bending portion 523 is partially torn off.

In an extended portion 52b, the fuse 525 is formed at opposite sides of the tear-off portion 524 where the bending portion 523 is partially torn off. The extended portion 52b allows the fuse 525 to be easily formed.

In addition, a first insulating layer 221 is formed at an inner side of the bending plate 522 for forming the gap G where the tear-off portion 524 is excluded. For example, when the conductor N penetrates, the conductor N may penetrate the case 15 and then the electrode assembly 10. In this case, the voltage charged in the electrode assembly 10 is rapidly discharged outside of the electrode assembly 10 through the case 15, the conductor N, and the short-circuit member 40.

The external current of electrode assembly 10 flows to the cap plate 20 through the rivet terminal 22a of the positive electrode terminal 22 coupled to the positive electrode lead tab 52 and a current path P2 coupled to the plate terminal 22c and the bending plate 522.

In this case, because the current path P2 is set up to pass through the fuse 525 that is formed in the bending portion 523, the external current of the electrode assembly 10 flows to the cap plate 20 through the fuse 525.

In this case, the bending plate 522 delays current flow by increasing the length of the current path P2 and by controlling an area of the current path P2 in the fuse 525, thereby delaying the current flow and controlling the amount of current at the same time.

As described above, because the current outside the electrode assembly 10 is controlled by the corresponding portion 52a and the extended portion 52b of the bending plate 522 and by the fuse 525 of the bending portion 523, secondary damage of the electrode assembly 10 due to the short-circuit current may be prevented when the conductor N penetrates the case 15.

In accordance with one or more of the aforementioned embodiments, a rechargeable battery is provided for preventing secondary damage of an electrode assembly due to a short-circuit current occurring when a conductor penetrates a case. These or other embodiments provide a rechargeable battery for controlling a current outside of an electrode assembly that is introduced into a conductor by way of an electrode terminal, a cap plate, and a case.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly to be charged and discharged;
a case including the electrode assembly;
a cap plate to seal an opening of the case; and
an electrode terminal in the cap plate and electrically coupled to the electrode assembly, wherein the electrode terminal includes a plate terminal at an upper area and a bent plate to electrically couple the plate terminal to the cap plate, wherein the bent plate sets a gap between the plate terminal and the cap plate, and wherein the electrode terminal includes an insertion plate in the gap, the insertion plate electrically insulated from the bending plate.

2. The battery as claimed in claim 1, wherein:
the electrode terminal includes a rivet terminal in a terminal hole of the cap plate, and
a gasket in the terminal hole of the cap plate adjacent the rivet terminal and in a through-hole of the bending plate, the gasket to provide electrically insulation between the cap plate and the bending plate.

3. The battery as claimed in claim 1, wherein the bending plate includes a first insulating layer at an inner side of the gap.

4. The battery as claimed in claim 3, wherein the bending plate includes a second insulating layer on a side facing the plate terminal.

5. The battery as claimed in claim 4, wherein the first insulating layer is on an entire inner surface of the bending plate.

6. The battery as claimed in claim 4, wherein the second insulating layer is partially formed in a bending portion of the bending plate based on the through-hole.

7. The battery as claimed in claim 6, wherein the bending plate includes a fuse at opposite sides of an area where the bending portion is partially torn off.

8. The battery as claimed in claim 1, wherein the electrode terminal includes a negative electrode terminal coupled to a negative electrode of the electrode assembly, and a positive electrode terminal coupled to a positive electrode of the electrode assembly, and wherein the negative electrode terminal is electrically coupled to a short-circuit surface between the electrode assembly and the case.

9. The battery as claimed in claim 1, wherein the plate terminal has a first side that is conductive and a second side that provides insulation above the bending plate.

10. The battery as claimed in claim 9, wherein the bending plate includes a first portion corresponding to the plate terminal and a second portion extending from the plate terminal.

11. The battery as claimed in claim 10, wherein the second portion includes a fuse at opposite sides of a portion where a bending portion is partially torn off.

12. The battery as claimed in claim 1, wherein the bending plate sets the gap in a direction that crosses a plane of the cap plate.

13. A battery, comprising:
a cap plate;
a first terminal;
a second terminal;
a plate terminal adjacent the first terminal; and
a plate to electrically couple the plate terminal to the cap plate, wherein the plate has a curve and provides a current path from the plate terminal to the cap plate having a length greater than an interval between the plate terminal and the cap plate, wherein the first terminal includes an insertion plate in a gap between first and second surfaces of the plate having the curve, the insertion plate electrically insulated from the plate having the curve.

14. The battery as claimed in claim 13, wherein:
the first terminal has a rivet terminal in a hole of the cap plate, and
a gasket in the hole of the cap plate adjacent the rivet terminal and in a through-hole of the bending plate, the gasket to provide electrically insulation between the cap plate and the plate having the curve.

15. The battery as claimed in claim 13, wherein the plate having the curve includes a first insulating layer at an inner side of the gap.

16. The battery as claimed in claim 15, wherein the plate having the curve includes a second insulating layer a side facing the plate terminal.

17. The battery as claimed in claim 16, wherein the second insulating layer is partially at the curve of the plate.

18. The battery as claimed in claim 13, wherein the first terminal is a positive terminal and the second terminal is a negative terminal.

\* \* \* \* \*